United States Patent [19]

Stelzer

[11] Patent Number: 4,630,661

[45] Date of Patent: Dec. 23, 1986

[54] PNEUMATIC VEHICLE TIRE TREAD, ESPECIALLY RADIAL-PLY TIRE FOR TRUCKS

[75] Inventor: Josef Stelzer, Vienna, Austria

[73] Assignee: Semperit Reifen AG, Vienna, Austria

[21] Appl. No.: 680,186

[22] Filed: Dec. 10, 1984

[30] Foreign Application Priority Data

Dec. 23, 1983 [AT] Austria .................................. 4505/83

[51] Int. Cl.$^4$ ............................................. B60C 11/06
[52] U.S. Cl. ................................................. 152/209 R
[58] Field of Search ....................... 152/209 R, 209 D; D12/142, 143

[56] References Cited

U.S. PATENT DOCUMENTS

| | | | |
|---|---|---|---|
| 2,779,378 | 1/1957 | Robertson | 152/209 R |
| 3,055,410 | 9/1962 | Caulkins | 152/209 R |
| 3,411,559 | 11/1968 | Verdier | 152/209 R |
| 3,951,193 | 4/1976 | Yeager . | |
| 4,114,671 | 9/1978 | Maiocchi et al. . | |
| 4,423,760 | 1/1984 | Treves et al. | 152/209 R |

Primary Examiner—Michael Ball
Attorney, Agent, or Firm—Werner W. Kleeman

[57] ABSTRACT

The tire comprises a tread with central grooves between exterior grooves. Both types of grooves extend in a zig-zag shape in the circumferential direction and define ribs between them. Each one of the central grooves is bounded by sidewalls which define two opposite sidewall sections between angled regions of the central grooves. The two sidewall sections alternate from one angled region to the other in the circumferential direction of the tread. A first sidewall section of the two opposite sidewall sections extends at least approximately normally to the tread and a second sidewall section of the two sidewall sections comprises two sidewall portions extending substantially normally to the tread and an interconnecting flank portion therebetween which extends at an inclination in the range of 20° to 60° with respect to a line perpendicular to the tread. The angled regions are located between consecutive groove sections and each one of the angled regions comprises a protruding or salient angled region and a receding or reentrant angled region each of which, in turn, is constituted by a first corner section extending substantially normally to the tread and a second corner section extending at an inclination towards the base of the groove and forming two substantially triangularly shaped portion which converge to a common point in the direction towards the base of the groove.

14 Claims, 3 Drawing Figures

PNEUMATIC VEHICLE TIRE TREAD, ESPECIALLY RADIAL-PLY TIRE FOR TRUCKS

BACKGROUND OF THE INVENTION

The present invention relates to a new and improved construction of a pneumatic vehicle tire, especially a radial-ply truck tire.

In its more particular aspects, the present invention relates to a new and improved construction of a pneumatic vehicle tire, especially a radial-ply truck tire which comprises a tread and ribs extending in the circumferential direction of the tread and separated by zig-zag-shaped grooves from each other. The cross-section of the central grooves decreases in a direction towards the base of each such groove.

In most cases radial-ply truck tires are provided with a tread which is subdivided in transverse direction into a predetermined number of ribs by zig-zag-shaped grooves extending in circumferential direction of the tread. It is also standard practice to form the sidewalls of the grooves at some inclination so that the groove narrows in the direction towards the base of the groove. This measure has the purpose of favorably affecting the rejection of foreign bodies, particularly stones, during driving. In this respect it has been suggested, for example, in U.S. Pat. No. 2,604,920, to arrange each of the sidewalls of the groove at respective constant inclinations or angles with respect to a line extending perpendicular to the tread.

In a further construction of tire as known, for example, from Austrian Pat. No. 309,250, the sidewalls of the grooves, instead of having a constant inclination, have an inclination which varies in a helical manner in circumferential direction. Such structure of the profile favorably affects wear after longer driving periods or service times and along straight routes. However, the rejection of foreign bodies during driving is only slightly enhanced by this type of profile. For this purpose a greater flare or opening angle of the groove would be required, whereby, however, the useful or positive tread or driving surface is reduced. Furthermore, only moderate traction can be expected from this known tire structure as well as from other known tire designs due to the identical zig-zag run or extension and due to the substantially symmetrical design of the groove sidewalls.

SUMMARY OF THE INVENTION

Therefore, with the foregoing in mind, it is a primary object of the present invention to provide a new and improved design of a pneumatic vehicle tire, especially a radial-ply truck tire, in which the wedging of foreign bodies into the grooves of the tread is efficiently prevented.

Another and more specific object of the present invention is directed to the provision of a new and improved construction of a pneumatic vehicle tire, especially a radial-ply truck tire, which has a tread which is subject to uniform wear even after longer driving periods or service times.

Still a further significant object of the present invention is directed to the provision of a new and improved structure of a pneumatic vehicle tire, especially a radial-ply truck tire, which has particularly favorable tread characteristics specifically with respect to traction and to straight running or directional stability.

Now in order to implement these and still further objects of the invention, which will become more readily apparent as the description proceeds, the pneumatic vehicle tire of the present development is manifested by the features that, the zig-zag-shaped central grooves which run or extend intermediate exterior grooves, when viewed in cross-section and in the region between the angled regions, preferably each comprise a first sidewall section which extends normally or approximately normally to the tread, and opposite thereto a dually or doubly-angled second sidewall section. The first and second sidewall sections are provided in an alternating relationship in consecutive groove sections of each zig-zag-shaped groove. each one of the angled regions comprises a protruding or salient angled region with recessed corner regions and a receding or reentrant angled region with protuberant corner regions.

According to the invention, therefore, a cross-section of the groove is proposed, particularly between the angled regions of the grooves, which effectively prevents wedging of foreign bodies and simultaneously enables the useful or positive driving or tread surface of the tread to be maintained at an optimum size. Due to the alternating succession of angled and approximately perpendicular sidewall sections and due to the provision of protuberant and recessed corner regions in each angled region there is obtained a uniform wear or abrasion of the tread. There is specifically prevented the formation of so-called "free-wheeling grooves" which if formed would first negatively affect the rib edges in the region of the angled portions which extend into the grooves. The pronounced structuring, specifically with reference to the arrangement of such grooves in the center region of the tread, has a particularly favorable effect on traction. In particular, there is also obtained an improved snow-gripping capacity of the tire profile in comparison to known tires comprising grooves which extend in a zig-zag shape.

Using the tire profile according to the invention, there are also achieved favorable results with respect to the straight running or directional stability and steering exactness or accuracy.

It has been found to be especially favorable when the dually or doubly-angled second sidewall section of the inventive pneumatic tire, when viewed in cross-section and in the region between the angled regions, is formed by two sidewall portions which extend substantially normally to the tread and which are interconnected by a flank portion extending at an inclination. The flank portion is thus especially capable of being arranged at such a small or flat angle that the rejection of stones and other foreign bodies is ensured in any case.

In this arrangement an angle $\alpha$ in the range of 20° to 60°, preferably of 40°, and formed by a line which extends perpendicularly to the tread and the inclined flank portion, has been found to be particularly favorable. This angle is selected as a function of the depth of the groove which, in turn, is dependent upon the type of tire.

In accordance with the invention a particularly uniform wear of the tread or running surface across the region of the first sidewall portion of the dually or doubly-angled sidewall section is achieved due to the fact that, when viewed from the top surface of the tread, each protuberant corner region and each recessed corner region is formed in such a manner that a related first corner section extends in accordance with the first sidewall section, preferably substantially normally to the tread.

It should also be ensured that there are provided protuberant and recessed corner regions which extend close to the base of the groove without the occurrence of any irregularities in the profile formed by the sidewalls of the grooves. Such irregularities could result in non-uniform wear of the tread and in variable traction behavior during such wear. In accordance with the invention there are provided for this reason, in each protuberant corner region and in each recessed corner region, two second corner sections which follow the related first corner section and which extend at a compound inclination in a direction towards the base of the groove as well as with respect to the circumferential direction of the tread. The two second corner sections are of a substantially triangularly shaped design, form an angle therebetween and converge to a common point in a direction towards the base of the groove.

Furthermore, it is of advantage in the inventive design of the pneumatic vehicle tire with respect to uniform wear across the entire width of the tread if the central grooves, which are arranged intermediate the exterior grooves, are formed to possess substantially the same width and if the exterior grooves have a lesser width and preferably a width which is about a quarter of the width of the central grooves.

In accordance with a further feature of the invention the wear to be expected in the shoulder region is maintained small and uniform due to the fact that the shoulder regions or bands, when measured from the outermost one of the central grooves, have a width which is approximately equal to one-quarter of the width of the tread.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
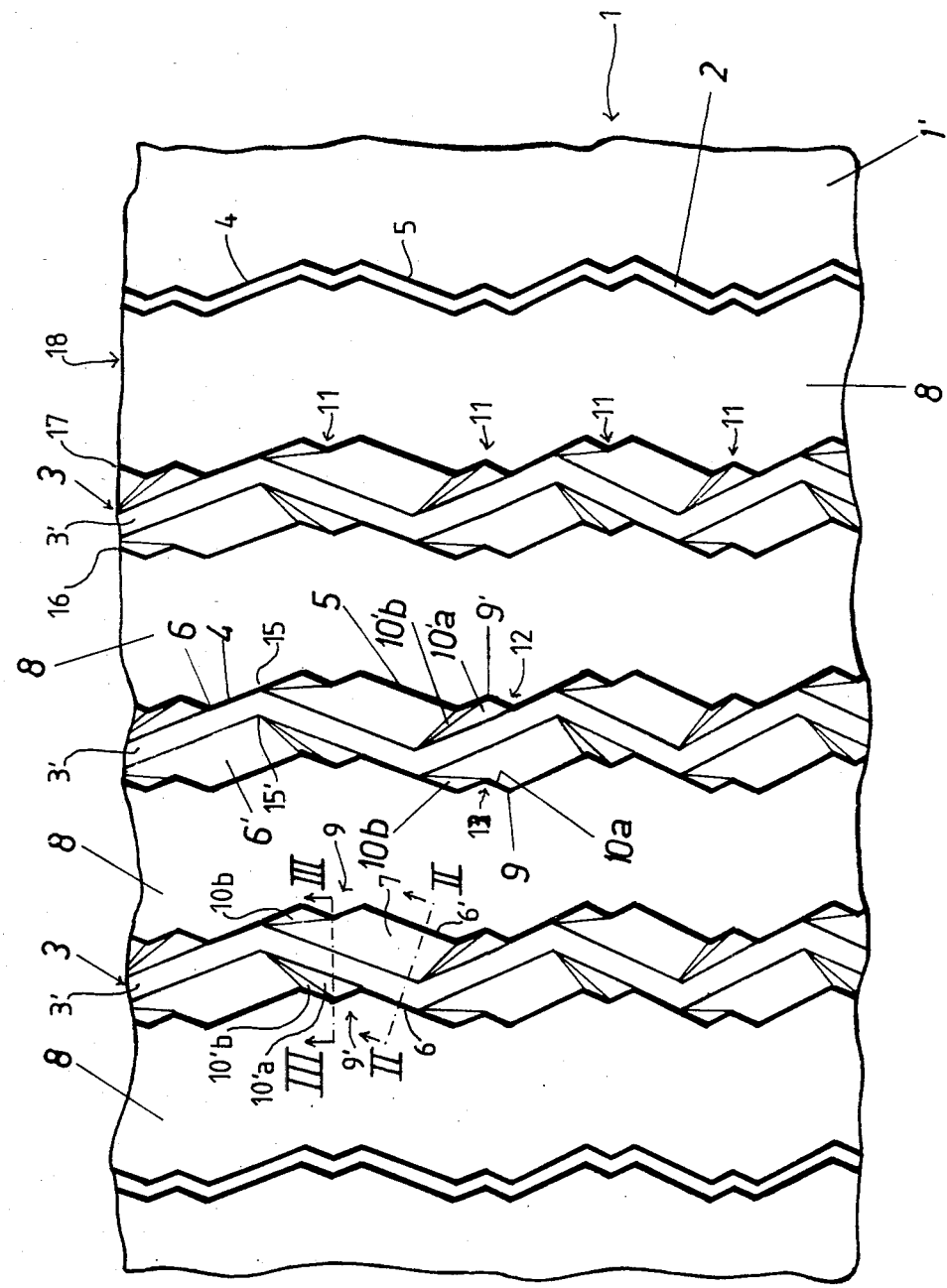
FIG. 1 is a top plan view of a part of the tread of the inventive pneumatic vehicle tire.

Describing now the drawings, it is to be understood that only enough of the structure of the pneumatic vehicle tire has been shown as needed for those skilled in the art to readily understand the underlying principles and concepts of the present development, while simplifying the showing of the drawings. Turning attention now specifically to FIG. 1, there has been illustrated therein in top plan view a part of a tread 1 intended for a radial-ply truck tire. It will be evident particularly from FIG. 1 that the tread 1 is subdivided in transverse direction into ribs 8 by means of five grooves 2, 3, which extend in a zig-zag course in the circumferential direction of the tread 1 and are each bounded by sidewalls 16, 17. In this structure two exterior or outer grooves 2 are of a narrow shape, whereas three or intermediate grooves 3 are of a wide shape. The grooves 2, 3 are composed of circumferentially alternatingly arranged groove sections 4, 5 which are alternatingly inclined in one or the other direction and which form an angle of inclination of about 25° with the circumferential direction of the tread 1.

Figure 2:
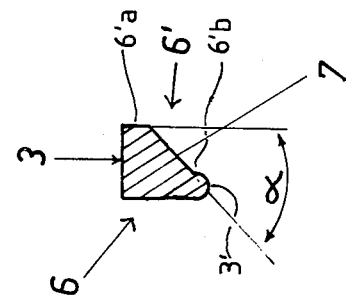
FIG. 2 is a section through a groove in the tread along the line II—II in FIG. 1.

The circumferentially consecutive groove sections 4, 5 of each wide or central groove 3 are separated from each other by angled regions 11 and the sidewalls 16, 17 comprise, in the region intermediate the angled regions 11, two sidewall sections 6, 6' having a course or direction of extent and an arrangement which is particularly evident from FIGS. 1 and 2. The first sidewall section 6 extends substantially normally to the tread 1 inwardly towards the base 3' of the groove 3 into a region close to the base 3'. The second sidewall section 6', opposite the first sidewall section 6, is formed to possess a dually or doubly-angled shape. This second sidewall section 6' comprises, firstly, a first wall portion 6'a which also extends substantially normally to the tread 1, a flank portion 7 following the first wall portion 6'a and extending at an inclination, and a further, second wall portion 6'b which extends substantially normally to the tread 1 in the direction towards the base 3' of the groove 3. The angle of inclination α of the flank portion 7, with respect to a line which extends perpendicular to the tread 1, amounts to about 45° in the present exemplary embodiment. In the individual, consecutive groove sections 4, 5 of the grooves 3 the region which bounds a related one of the ribs 8 is alternatingly formed by the first approximately perpendicular sidewall sections 6 and the dually-or doubly-angled sidewall sections 6'.

Figure 3:
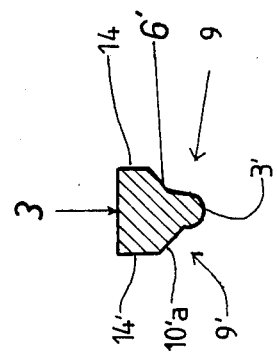
FIG. 3 is a section through the groove shown in FIG. 2 along the line III—III in FIG. 1.

Each angled region 11 between the consecutive groove sections 4, 5 comprises a protruding or salient angled region 12 and a receding or reentrant angled region 13. In the region of each one of the protruding or salient angled regions 12 in each one of the zig-zag-shaped grooves 3 there is formed a related recessed corner region 9' and in the region of each one of the receding or reentrant angled regions 13 in each one of the zig-zag-shaped grooves 3 there is formed a related protuberant corner region 9. As evident particularly from FIG. 3, when viewed from a top surface 1' of the tread 1, a respective first corner section 14' and 14 of each recessed corner region 9' and of each protuberant corner region 9 is formed in accordance with the normally or perpendicularly extending first sidewall portion 6'a of the first sidewall section 6'. Following the first corner sections 14 and 14' in each one of the protuberant corner regions 9 and of the recessed corner regions 9' are two second corner sections 10a, 10b and 10'a, 10'b, respectively.

It is evident particularly from FIG. 1 that the two second corner sections 10a, 10b and 10'a, 10'b constitute substantially triangularly shaped transition regions which extend at an angle towards the base 3' of the groove 3 as well as with respect to the circumferential direction of the tread 1. In the case of the protuberant corner regions 9 an angle is formed between the two second corner sections 10a, 10b which are formed in a protruding fashion to meet in a salient arris. In the case of the recessed corner regions 9' the two second corner sections 10'a, 10'b are correspondingly arranged in a receding fashion to meet in a reentrant corner. The two second corner sections 10a, 10b, 10'a, 10'b are formed in this structure in such a manner that they converge in a direction towards the base 3' of the groove 3 to a related common or conjunction point such as a salient conjunction point 15 or a reentrant conjunction point 15', preferably until they reach the associated second wall portion 6'b which extends substantially normally or perpendicularly to the tread 1. A substantially uniform profile of the sidewalls 16 and 17 of the grooves 3 is thus ensured to extend towards the base 3' of each groove 3, whereby particularly favorable results can be achieved with respect to the traction behavior or characteristic and with respect to the wear of the tire throughout the entire running or service life thereof. Non-uniform wear would occur to the greatest extent in the angled regions of the ribs 8 which extend into the grooves 3, as is well known in the art.

As already initially mentioned, the inventive structure of the sidewall sections 6 and 6' additionally results in the effect that stones are expelled in an optimum manner and that, simultaneously, the useful or positive tread or running surface of the tread 1 can be maintained as large as possible.

It is of advantage for uniform wear across the entire width of the tread 1 that the three central grooves 3 essentially have the same width and that the width of the two exterior grooves 2 amounts to about one-quarter of the width of the central grooves 3. In this connection an advantageous effect is attained when the width of shoulder regions or bands 18, which are measured from the outermost one of the central grooves 3, amounts to about one-quarter of the width of the tread 1.

The invention is not limited to the illustrated exemplary embodiment. Thus, it is possible particularly to vary the inclination of the flank portion of the dually-angled sidewall section and for this variation an angle in the range of 20° to 60° is suggested depending on the depth of the groove or the type of tire. In connection therewith it may also be advantageous to arrange the first wall portion of the dually- or doubly-angled sidewall section at an inclination with respect to a line which extends perpendicular to the tread.

While there are shown and described present preferred embodiments of the invention, it is to be distinctly understood that the invention is not limited thereto, but may be otherwise variously embodied and practiced within the scope of the following claims.

Accordingly, what I claim is:

1. A pneumatic vehicle tire, especially a radial-ply truck tire, comprising:
   a tread defining a circumferential direction;
   a predetermined number of ribs formed in said tread and extending in said circumferential direction thereof;
   a predetermined number of zig-zag-shaped grooves separating said ribs from each other;
   each one of said predetermined number of zig-zag-shaped grooves defining a base and having a cross-section which decreases towards said base;
   each one of said predetermined number of zig-zag-shaped grooves being bounded by two opposite sidewalls and defining angled regions;
   each one of said predetermined number of zig-zag-shaped grooves, when viewed in cross-section and between said angled regions, being bounded by a first sidewall section which extends at least approximately normally to said tread, and a second sidewall section located opposite said first sidewall section and constituting a dually-angled sidewall section;
   each one of said predetermined number of zig-zag-shaped grooves comprising circumferentially consecutive groove sections;
   said first sidewall sections and said second sidewall sections being disposed on alternating sides of each one of said grooves in said circumferentially consective groove sections of each one of said grooves;
   each said angled region in each one of said predeterminded number of zig-zag-shaped grooves comprising a salient angled region and a reentrant angled region confronting said salient angled region across each one of said grooves; and
   each one of said predetermined number of zig-zag-shaped grooves comprising a recessed corner region formed in each said salient angled region and a protuberant corner region formed in each said reentrant angled region.

2. The pneumatic vehicle tire as defined in claim 1, further including:
   exterior grooves; and
   said predetermined number of zig-zag-shaped grooves constitutes a predetermined number of central grooves extending between said exterior grooves.

3. The pneumatic vehicle tire as defined in claim 1, wherein:
   said second, dually-angled sidewall section, when viewed in cross-section and between said angled regions of each one of said predetermined number of zig-zag-shaped grooves, is formed by two sidewall portions which extend substantially normally to said tread and which are interconnected by a flank portion extending at an inclination.

4. The pneumatic vehicle tire as defined in claim 3, wherein:
   said flank portion extends at an angle of inclination in the range of 20° to 60° with respect to a line perpendicular to said tread.

5. The pneumatic vehicle tire as defined in claim 4, wherein:
   said flank portion extends at an angle of inclination of about 40° with respect to the line perpendicular to said tread.

6. The pneumatic vehicle tire as defined in claim 1, wherein:
   said tread defines a top surface; and
   each one of said protuberant corner regions and of said recessed corner regions, when viewed from said top surface of said tread, comprising a first corner section extending substantially in the same manner as said first sidewall section with respect to said tread.

7. The pneumatic vehicle tire as defined in claim 6, wherein:
   first corner section extends substantially normally to said tread.

8. The pneumatic vehicle tire as defined in claim 6, wherein:
   each one of said protuberant corner regions and of said recessed corner regions comprises two second corner sections following said first corner section thereof;
   said two second corner sections extending at an inclination with respect to the base of a related one of said predetermined number of zig-zag-shaped grooves as well as with respect to said circumferential direction defined by said tread;

said two second corner sections each having a substantially triangular shape; and said two second corner sections forming therebetween a predetermined angle and converging to a common point towards said base of said related groove.

9. The pneumatic vehicle tire as defined in claim 2, wherein:

said central grooves forming said predetermined number of zig-zag-shaped grooves are of substantially the same width; and said exterior grooves having a predetermined width which is smaller than the width of said central grooves.

10. The pneumatic vehicle tire as defined in claim 9, wherein:

said exterior grooves have a predetermined width which amounts to about one-quarter of the width of said central grooves.

11. The pneumatic vehicle tire as defined in claim 2, further including:

a predetermined number of shoulder regions;

said tread having a predetermined width; and each one of said shoulder regions having a predetermined width which, when measured from the outermost one of said central grooves, amounts to about one-quarter of said predetermined width of said tread.

12. A pneumatic vehicle tire, comprising:

a tread surface defining a circumferential direction, a radial direction and a lateral direction of the pneumatic vehicle tire;

at least one zig-zag tread groove formed in said tread surface and defining a groove base;

said at least one zig-zag tread groove having first and second mutually confronting lateral walls intersecting said tread surface and extending inwardly to said groove base;

said at least one zig-zag tread groove having a normal wall configuration and a doubly-angled wall configuration;

said normal wall configuration extending substantially in said radial direction from said tread surface to said groove base;

said double-angled wall configuration having an outer portion, an inner portion and an intermediate flank portion;

said outer portion extending substantially in said radial direction for intersecting said tread surface;

said inner portion extending substantially in said radial direction for meeting said groove base;

said intermediate flank portion intersecting said outer portion and said inner portion and extending therebetween at an inclination relative to said radial direction such that said outer portion defines at said tread surface an outer width of said at least one zig-zag tread groove which is greater in magnitude than an inner width of said at least one zig-zag tread groove defined at said groove base by said inner portion;

said at least one zig-zag tread groove having a succession of first regions and second regions mutually alternating in said circumferential direction and extending in successively alternating senses of obliquity thereto;

said normal wall configuration prevailing at said first lateral wall in said first regions and at said second lateral wall in said second regions;

said doubly-angled wall configuration prevailing at said second lateral wall in said first regions and at said first lateral wall in said second regions;

said first regions and said second regions meeting in angled regions;

said normal wall configurations of said first regions and said doubly-angled wall configurations of said second regions intersecting said tread surface to form alternating first salient angles and first reentrant angles;

said normal wall configurations of said second regions and said doubly angled wall configurations of said first regions intersecting said tread surface to form second reentrant angles confronting said first salient angles across said at least one zig-zag tread groove and second salient angles confronting said first reentrant angles across said at least one zig-zag tread groove;

each said salient angle of said first and second salient angles having an apex region interrupted by a reentrant recess between said normal wall configuration and said doubly-angled wall configuration; and each said reentrant angle of said first and second reentrant angles having an apex region interrupted by a salient protuberance between said normal wall configuration and said doubly-angled wall configuration such that said salient protuberance of each said reentrant angle confronts a related one of said reentrant recesses of said salient angles across said at least one zig-zag tread groove.

13. The pneumatic vehicle tire as defined in claim 12, wherein:

said intermediate flank portion and said inner portion of said doubly-angled wall configuration and said normal wall configuration all mutually intersect at a salient conjunction point;

said salient protuberance having an outer portion corresponding to said outer portion of said doubly-angled wall configuration;

said outer portion of said salient protuberance comprising a first wall portion extending substantially parallel to said normal wall configuration and a second wall portion extending substantially parallel to said outer portion of said doubly-angled wall configuration;

said first wall portion and said second wall portion mutually intersecting to form a salient arris;

said salient protuberance having a transition portion corresponding to said intermediate flank portion of said doubly-angled wall configuration;

said transition portion comprising a first triangular flank intersecting said first wall portion and converging to said salient conjunction point and a second triangular flank intersecting said second wall portion and converging to said salient conjunction point; and said first and second triangular flanks mutually intersecting to form a salient flank arris.

14. The pneumatic vehicle tire as defined in claim 12, wherein:

said intermediate flank portion and said inner portion of said doubly-angled wall configuration and said normal wall configuration all mutually intersect at a reentrant conjunction point;

said reentrant recess having an outer portion corresponding to said outer portion of said doubly-angled wall configuration;

said outer portion of said reentrant recess comprising a first wall portion extending substantially parallel to said normal wall configuration and a second wall portion extending substantially parallel to said outer portion of said doubly-angled wall configuration;

said first wall portion and said second wall portion mutually intersecting to form a reentrant corner;

said reentrant recess having a transition portion corresponding to said intermediate flank portion of said doubly-angled wall configuration;

said transition portion comprising a first triangular flank intersecting said first wall portion and converging to said reentrant conjunction point and a second triangular flank intersecting said second wall portion and converging to said reentrant conjunction point; and said first and second triangular flanks mutually intersecting to form a reentrant flank corner.

* * * * *